(12) United States Patent
Lee et al.

(10) Patent No.: US 9,226,272 B2
(45) Date of Patent: Dec. 29, 2015

(54) METHOD AND APPARATUS FOR TRANSMITTING CHANNEL STATUS INFORMATION TO MACRO BASE STATION BY RELAY NODE IN WIRELESS COMMUNICATION SYSTEM TO WHICH CARRIER AGGREGATION IS APPLIED

(75) Inventors: Seungmin Lee, Anyang-si (KR); Hakseong Kim, Anyang-si (KR); Hanbyul Seo, Anyany-si (KR)

(73) Assignee: LG Electronics Inc., Seoul (KR)

( * ) Notice: Subject to any disclaimer, the term of this patent is extended or adjusted under 35 U.S.C. 154(b) by 249 days.

(21) Appl. No.: 13/979,837

(22) PCT Filed: Feb. 3, 2012

(86) PCT No.: PCT/KR2012/000821
§ 371 (c)(1),
(2), (4) Date: Jul. 15, 2013

(87) PCT Pub. No.: WO2012/115364
PCT Pub. Date: Aug. 30, 2012

(65) Prior Publication Data
US 2013/0286933 A1   Oct. 31, 2013

Related U.S. Application Data

(60) Provisional application No. 61/446,509, filed on Feb. 25, 2011, provisional application No. 61/447,097, filed on Feb. 28, 2011, provisional application No. 61/486,753, filed on May 16, 2011.

(51) Int. Cl.
*H04B 7/14*   (2006.01)
*H04W 72/04*   (2009.01)
*H04L 1/00*   (2006.01)
*H04L 5/00*   (2006.01)

(52) U.S. Cl.
CPC ............ *H04W 72/04* (2013.01); *H04L 1/0026* (2013.01); *H04L 5/001* (2013.01); *H04L 5/005* (2013.01); *H04L 5/0057* (2013.01)

(58) Field of Classification Search
None
See application file for complete search history.

(56) References Cited

U.S. PATENT DOCUMENTS

2009/0186645 A1\* 7/2009 Jaturong et al. ............. 455/507
2010/0234037 A1   9/2010 Terry et al.
2011/0243066 A1\* 10/2011 Nayeb Nazar et al. ....... 370/328
(Continued)

OTHER PUBLICATIONS

R1-106122, "Triggering of Aperiodic CQI for DL CCs", 3GPP TSG-RAN WG1 #63, Nov. 19, 2010.
(Continued)

*Primary Examiner* — Phirin Sam
(74) *Attorney, Agent, or Firm* — Dentons US LLP

(57) ABSTRACT

A method and apparatus for transmitting channel status information (CSI) to a macro eNB (MeNB) by a relay node (RN) in a wireless communication system to which carrier aggregation is applied are disclosed. The method includes receiving a CSI reporting request corresponding to a specific secondary component carrier (CC) from the transmitter through a primary CC, establishing a reference resource for the CSI in association with one or more secondary CCs indicated by the CSI reporting request, and transmitting CSIs of the one or more secondary CCs to the transmitter through the specific secondary CC, using the established reference resource. The reference resource is set to the nearest subframe serving as a valid downlink subframe from a reception time point of the CSI reporting request.

10 Claims, 13 Drawing Sheets

(56) References Cited

U.S. PATENT DOCUMENTS

| | | | |
|---|---|---|---|
| 2011/0274043 A1* | 11/2011 | Nam et al. | 370/328 |
| 2012/0039252 A1* | 2/2012 | Damnjanovic et al. | 370/328 |
| 2012/0040687 A1* | 2/2012 | Siomina et al. | 455/456.1 |
| 2012/0140708 A1* | 6/2012 | Choudhury et al. | 370/328 |
| 2012/0201154 A1* | 8/2012 | Chandrasekhar et al. | 370/252 |
| 2012/0207047 A1* | 8/2012 | Liao et al. | 370/252 |
| 2012/0213096 A1* | 8/2012 | Krishnamurthy et al. | 370/252 |
| 2012/0287828 A1* | 11/2012 | Chen et al. | 370/280 |
| 2013/0040558 A1* | 2/2013 | Kazmi | 455/9 |
| 2013/0308484 A1* | 11/2013 | Lunttila et al. | 370/252 |
| 2013/0329646 A1* | 12/2013 | Fukumoto et al. | 370/328 |
| 2014/0140281 A1* | 5/2014 | Choudhury et al. | 370/328 |
| 2015/0230252 A1* | 8/2015 | Lunttila et al. | H04W 72/0453 |

OTHER PUBLICATIONS

R1-110027, "Periodic CSI reporting for CA", 3GPP TSG RAN WG1 Meeting #63bis, Jan. 21, 2010.

R1-110328, "Periodic CSI reporting in case of multiple DL CCs configured", 3GPP TSG RAN WG1 #63bis, Jan. 21, 2011.

* cited by examiner

FIG. 2
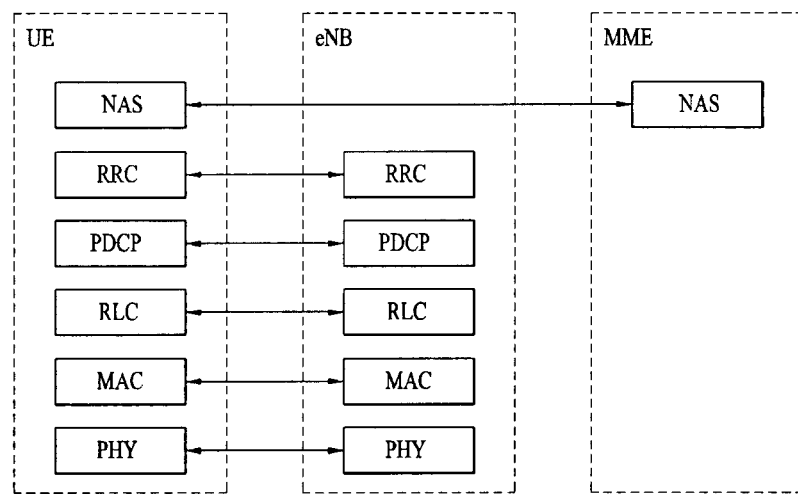
(a) Control Plane Protocol Stack
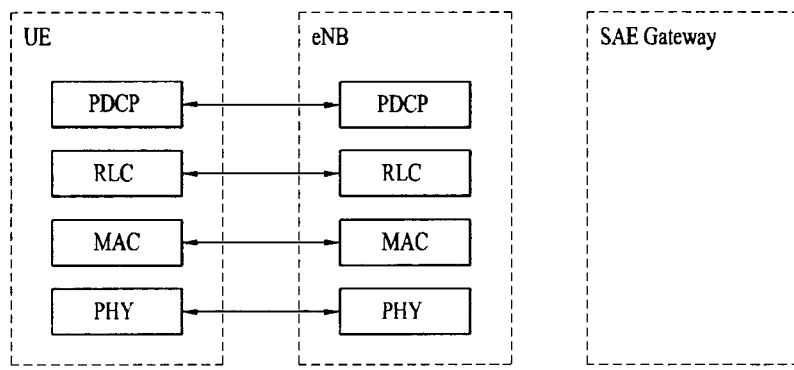
(b) User Plane Protocol Stack

METHOD AND APPARATUS FOR TRANSMITTING CHANNEL STATUS INFORMATION TO MACRO BASE STATION BY RELAY NODE IN WIRELESS COMMUNICATION SYSTEM TO WHICH CARRIER AGGREGATION IS APPLIED

This application is a 35 USC § 371 National Stage entry of International Application No. PCT/KR2012/000821 filed on Feb. 3, 2012, and claims the benefit and priority to U.S. Provisional Application Nos. 61/446,509 filed Feb. 25, 2011, 61/447,097 filed Feb. 28, 2011, and 61/486,753 filed May 16, 2011, all of which are incorporated by reference in their entirety herein.

TECHNICAL FIELD

The present invention relates to a wireless communication system, and more particularly to a method and apparatus for transmitting channel status information to a macro base station (BS) by a relay node in a wireless communication system to which carrier aggregation is applied.

BACKGROUND ART

As a representative example of a wireless communication system of the present invention, a $3^{rd}$ Generation Partnership Project Long Term Evolution (3GPP LTE) communication system will hereinafter be described in detail.

FIG. 1 is a conceptual diagram illustrating an Evolved Universal Mobile Telecommunications System (E-UMTS) network structure as an exemplary mobile communication system. In particular, the Enhanced Universal Mobile Telecommunications System (E-UMTS) has evolved from a legacy UMTS system, and basic standardization thereof is now being conducted by the 3rd Generation Partnership Project (3GPP). E-UMTS may also be referred to as Long Term Evolution (LTE). For details of the technical specifications of UMTS and E-UMTS, refer to Release 7 and Release 8 of "3rd Generation Partnership Project; Technical Specification Group Radio Access Network".

As shown in FIG. 1, the E-UMTS system is broadly made up of a User Equipment (UE), base stations (or eNode-Bs), and an Access Gateway (AG) which is located at an end of a network (E-UTRAN) and is connected to an external network. Generally, an eNode-B can simultaneously transmit multiple data streams for a broadcast service, a multicast service and/or a unicast service.

Each eNode-B includes one or more cells. One cell of the eNode-B is set to use a bandwidth such as 1.25, 2.5, 5, 10, 15 or 20 MHz to provide a downlink or uplink transmission service to user equipments (UEs). Here, different cells may be set to use different bandwidths. The eNode-B controls transmission and reception of data for several UEs. In association with downlink (DL) data, the eNode-B transmits downlink (DL) scheduling information to a corresponding UE, so as to inform the corresponding UE of time/frequency domains where data is to be transmitted, coding information, data size information, Hybrid Automatic Repeat and reQuest (HARQ)-related information, and the like. In association with uplink (UL) data, the eNode-B transmits UL scheduling information to the corresponding UE, so that it informs the corresponding UE of time/frequency domains capable of being used by the corresponding UE, coding information, data size information, HARQ-related information, and the like. An interface for transmission of user traffic or control traffic may be used between eNode-Bs. A Core Network (CN) may include an Access Gateway (AG) and a network node for user registration of the UE. The AG manages mobility of a UE on the basis of a Tracking Area (TA) composed of several cells.

Although wireless communication technology has been developed to LTE technology on the basis of WCDMA technology, users and enterprises continuously demand new feature and services. In addition, other wireless access technologies are being developed, such that there is a need for new or improved wireless access technology in order to remain competitive in the long run. For example, reduction in cost per bit, increase of service availability, adaptive frequency band utilization, a simple structure, an open-type interface, and appropriate user equipment (UE) power consumption are needed for the new or improved wireless access technology.

DISCLOSURE

Technical Problem

An object of the present invention devised to solve the problem lies on a method and apparatus for transmitting channel status information to a macro BS by a relay node (RN) in a wireless communication system to which carrier aggregation is applied.

Technical Solution

The object of the present invention can be achieved by providing a method for transmitting channel state information (CSI) from a receiver to a transmitter in a wireless communication system to which carrier aggregation is applied, the method including: receiving a CSI reporting request corresponding to a specific secondary component carrier (CC) from the transmitter through a primary CC; establishing a reference resource for the CSI in association with one or more secondary CCs indicated by the CSI reporting request; and transmitting CSIs of the one or more secondary CCs to the transmitter through the specific secondary CC, using the established reference resource, wherein the reference resource is set to the nearest subframe serving as a valid downlink subframe from a reception time point of the CSI reporting request.

The reference resource is the nearest valid downlink subframe #m of a previous time including the downlink subframe #n, from a downlink subframe #n where the CSI reporting request is received. Or, the reference resource is the nearest valid downlink subframe #m of a previous time excluding the downlink subframe #n, from a downlink subframe #n where the CSI reporting request is received.

Or, if the CSI reporting request is received at a downlink subframe #(k−4) and the CSI is transmitted at an uplink subframe #k, the reference resource the nearest valid downlink subframe #p located before the downlink subframe #(k−4), from the downlink subframe #(k−4).

The one or more secondary CCs are established by higher layer signaling through the primary CC.

In another aspect of the present invention, provided herein is a relay node (RN) for use in a wireless communication system to which carrier aggregation is applied, the relay node (RN) including: a reception module for receiving a channel state information (CSI) reporting request corresponding to a specific secondary component carrier (CC) from a macro eNB (MeNB) through a primary CC; a processor for establishing a reference resource for the CSI in association with one or more secondary CCs indicated by the CSI reporting request; and a transmission module for transmitting CSIs of the one or more secondary CCs to the macro eNB (MeNB) through the specific secondary CC, using the established reference resource, wherein the reference resource is set to the nearest subframe established as a backhaul downlink subframe from a reception time point of the CSI reporting request.

The reference resource is the nearest valid downlink subframe #m of a previous time including the downlink subframe #n, from a downlink subframe #n where the CSI reporting request is received. Or, the reference resource is the nearest valid downlink subframe #m of a previous time excluding the downlink subframe #n, from a downlink subframe #n where the CSI reporting request is received.

Or, if the CSI reporting request is received at a downlink subframe #(k−4) and the CSI is transmitted at an uplink subframe #k, the reference resource the nearest valid downlink subframe #p located before the downlink subframe #(k−4), from the downlink subframe #(k−4).

The one or more secondary CCs are established by higher layer signaling through the primary CC.

Advantageous Effects

As can be seen from the embodiments of the present invention, a relay node for use in a wireless communication system based on carrier aggregation can effectively feed back channel status information to a macro BS.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 2 illustrates a control plane and a user plane (U-Plane) of a radio interface protocol between a User Equipment (UE) and an E-UTRAN according to the 3GPP wireless access network standard;

BEST MODE

Figure 1:
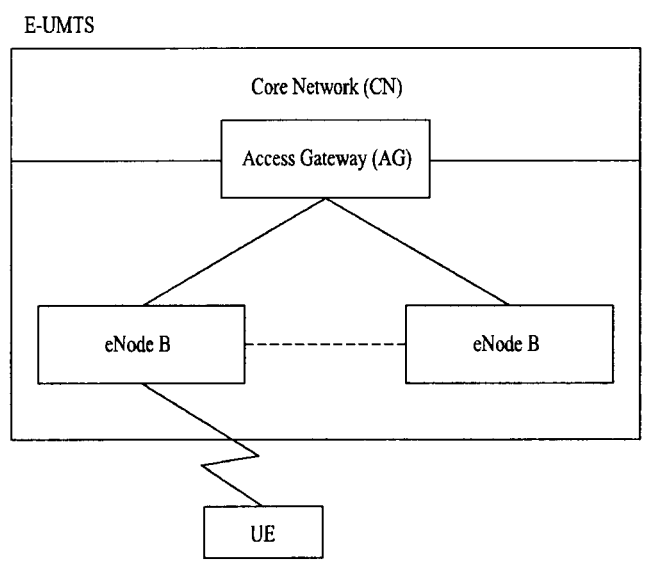
FIG. 1 is a conceptual diagram illustrating an Evolved Universal Mobile Telecommunications System (E-UMTS) network structure as an example of a wireless communication system.

Reference will now be made in detail to the preferred embodiments of the present invention, examples of which are illustrated in the accompanying drawings. Wherever possible, the same reference numbers will be used throughout the drawings to refer to the same or like parts. The above and other configurations, operations, and features of the present invention will be easily understood from the embodiments of the invention described below with reference to the accompanying drawings. The embodiments described below are examples wherein technical features of the invention are applied to a $3^{rd}$ Generation Partnership Project (3GPP) system.

Although the embodiment of the present invention will be disclosed on the basis of an LTE system and an LTE-A system for convenience of description and better understanding of the present invention, it should be noted that the scope or spirit of the present invention is not limited thereto and can be applied to other communication systems as necessary.

FIG. 2 illustrates a control plane and a user plane (U-Plane) of a radio interface protocol between a User Equipment (UE) and an E-UTRAN according to the 3GPP wireless access network standard. The control plane is a passage through which control messages that a UE and a network use in order to manage calls are transmitted. The user plane is a passage through which data (e.g., voice data or Internet packet data) generated at an application layer is transmitted.

The physical layer, which is the first layer, provides an information transfer service to an upper layer using a physical channel. The physical layer is connected to a Medium Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel uses time and frequency information as radio resources. In more detail, using the time and frequency information as radio resources, the physical channel is modulated according to the Orthogonal Frequency Division Multiple Access (OFDMA) scheme via a downlink, and is modulated according to the Single Carrier Frequency Division Multiple Access (SC-FDMA) scheme via an uplink.

The MAC layer of the second layer provides a service to a Radio Link Control (RLC) layer, located above the MAC layer, through a logical channel. The RLC layer of the second layer enhances data transmission reliability. The functions of the RLC layer may also be implemented through internal functional blocks of the MAC layer. A PDCP layer of the second layer performs a header compression function to reduce unnecessary control information in order to efficiently transmit IP packets such as IPv4 or IPv6 packets over a radio interface with a relatively narrow bandwidth.

A Radio Resource Control (RRC) layer located at the lowest part of the third layer is defined only in the control plane and is responsible for control of logical, transport, and physical channels in association with configuration, re-configuration and release of Radio Bearers (RBs). The radio bearer (RB) is a service that the second layer provides for data communication between the UE and the network. To accomplish this, the RRC layer of the UE and the RRC layer of the network exchange RRC messages. The UE is in RRC connected mode if an RRC connection has been established between the RRC layer of the network and the RRC layer of the UE. Otherwise, the UE is in RRC idle mode. A Non-Access Stratum (NAS) layer located above the RRC layer performs functions such as session management and mobility management.

One cell of the eNB (eNode-B) is set to use a bandwidth such as 1.25, 2.5, 5, 10, 15 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH) and a Multicast Traffic Channel (MTCH).

Figure 3:
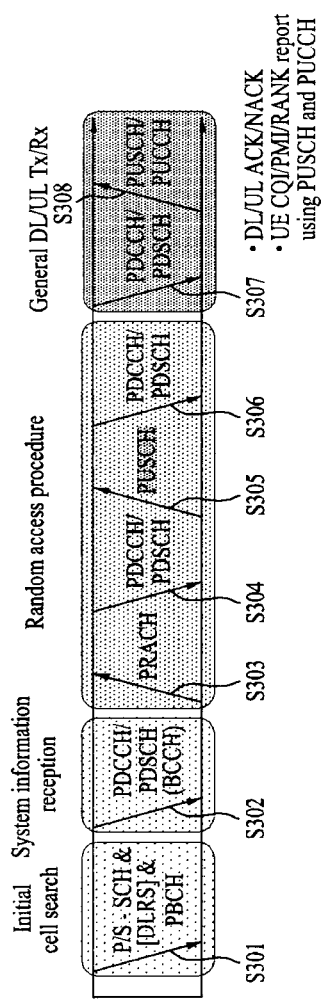
FIG. 3 is a conceptual diagram illustrating physical channels for use in a 3GPP system and a general method for transmitting a signal using the physical channels.

FIG. 3 is a conceptual diagram illustrating physical channels for use in a 3GPP system and a general method for transmitting a signal using the physical channels.

Referring to FIG. 3, when powered on or when entering a new cell, a UE performs initial cell search in step S301. The initial cell search involves synchronization with a BS. Specifically, the UE synchronizes with the BS and acquires a cell Identifier (ID) and other information by receiving a Primary Synchronization CHannel (P-SCH) and a Secondary Synchronization CHannel (S-SCH) from the BS. Then the UE may acquire information broadcast in the cell by receiving a Physical Broadcast CHannel (PBCH) from the BS. During the initial cell search, the MS may monitor a downlink channel status by receiving a downlink Reference Signal (DL RS).

After the initial cell search, the UE may acquire more specific system information by receiving a Physical Downlink Control CHannel (PDCCH) and receiving a Physical Downlink Shared CHannel (PDSCH) based on information of the PDCCH in step S302.

On the other hand, if the UE initially accesses the BS or if the UE does not have radio resources for signal transmission, it may perform a random access procedure to the BS in steps S303 to S306. For the random access, the UE may transmit a predetermined sequence as a preamble to the BS on a Physical Random Access CHannel (PRACH) in steps S303 and S305 and receive a response message for the random access on a PDCCH and a PDSCH corresponding to the PDCCH in steps S304 and S306. In the case of contention-based RACH, the UE may perform a contention resolution procedure.

After the foregoing procedure, the UE may receive a PDCCH and a PDSCH in step S307 and transmit a Physical Uplink Shared CHannel (PUSCH) and a Physical Uplink Control CHannel (PUCCH) in step S308, as a general downlink/uplink (DL/UL) signal transmission procedure. In particular, the UE receives downlink control information (DCI) through a PDCCH. In this case, DCI includes control information such as resource allocation information for the UE, and has different formats according to use purposes.

On the other hand, uplink control information transmitted from the UE to the BS or downlink control information transmitted from the UE to the BS may include a downlink (DL) or uplink (UL) ACKnowledgement/Negative ACKnowledgment (ACK/NACK) signal, a Channel Quality Indicator (CQI), a Precoding Matrix Index (PMI) and/or a Rank Indicator (RI). The UE adapted to operate in the 3GPP LTE system may transmit the control information such as a CQI, a PMI, and/or an RI on the PUSCH and/or the PUCCH.

Figure 4:
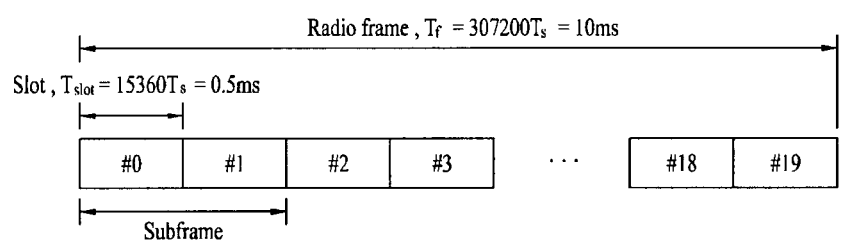
FIG. 4 is a diagram illustrating a structure of a radio frame used in an LTE system.

FIG. 4 is a diagram illustrating a structure of a radio frame used in an LTE system.

Referring to FIG. 4, the radio frame has a length of 10 ms ($327200 \times T_s$) and includes 10 subframes of equal size. Each subframe has a length of 1 ms and includes two slots. Each slot has a length of 0.5 ms ($15360 \times T_s$). In this case, $T_s$ represents sampling time, and is expressed by '$T_s=1/(15 \text{ kHz} \times 2048)=3.2552 \times 10^{-8}$ (about 33 ns)'. The slot includes a plurality of OFDM symbols in a time domain, and includes a plurality of resource blocks (RBs) in a frequency domain. In the LTE system, one resource block includes 12 subcarriers×7 (or 6) OFDM (Orthogonal Frequency Division Multiplexing) symbols. A Transmission Time Interval (TTI) which is a transmission unit time of data can be determined in a unit of one or more subframes. The aforementioned structure of the radio frame is only exemplary, and various modifications can be made to the number of subframes contained in the radio frame or the number of slots contained in each subframe, or the number of OFDM symbols in each slot.

Figure 5:
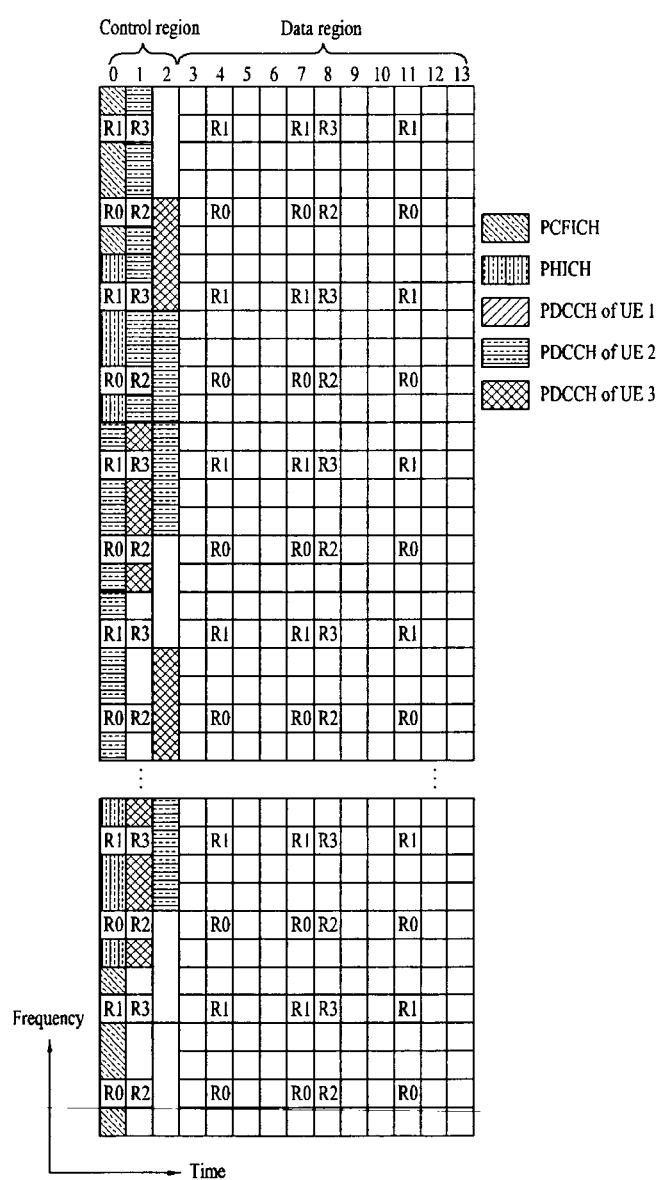
FIG. 5 illustrates a downlink (DL) radio frame structure for use in an LTE system.

FIG. 5 shows a control channel contained in a control region of one subframe in a downlink radio frame according to one embodiment of the present invention.

Referring to FIG. 5, one subframe includes 14 OFDM symbols. First to third ones of the 14 OFDM symbols may be used as a control region, and the remaining OFDM symbols (i.e., 11 to 13 OFDM symbols) may be used as a data region. In FIG. 5, R1 to R4 represent reference signals (RSs) (also called pilot signals) of antennas 0 to 3, respectively. In a general subframe, RSs of the antennas 0 to 3 are fixed to a predetermined pattern irrespective of a control region and a data region. The control channel is allocated to a resource, to which the RS is not allocated, in the control region. A traffic channel is allocated to a resource, to which the RS is not allocated, in the data region. A variety of control channels may be allocated to the control region, for example, a physical control format indicator channel (PCFICH), a physical hybrid-ARQ indicator channel (PHICH), a physical downlink control channel (PDCCH), etc.

PCFICH is used as a physical control format indicator channel, and informs the UE of the number of OFDM symbols used for PDCCH at every subframe. PCFICH is located at a first OFDM symbol, and is established to have priority over PHICH and PDCCH. PCFICH includes 4 resource element groups (REGs), and individual REGs are distributed into the control region on the basis of a cell ID. One REG includes four REs. The RE is a minimum physical resource defined by 'one subcarrier×one OFDM symbol'. The PCFICH value indicates values of 1 to 3 or values of 2 to 4 according to bandwidth, and is QPSK (Quadrature Phase Shift Keying)-modulated.

PHICH is used as a physical HARQ (Hybrid-Automatic Repeat and reQuest) indicator channel, and carries HARQ ACK/NACK signals for uplink transmission. In other words, PHICH indicates a channel for transmitting DL ACK/NACK information for UL HARQ. The PHICH includes one REG, and is cell-specifically scrambled. An ACK/NACK signal indicated by one bit is BPSK (Binary Phase Shift Keying)-modulated. The modulated ACK/NACK is spread with a spreading factor (SF) of 2 or 4. Several PHICHs mapped to the same resources construct a PHICH group. The number of PHICHs multiplexed in the PHICH group may be determined according to the number of spreading codes. PHICH (or PHICH group) may be repeated three times so as to obtain a diversity gain from a frequency domain and/or a time domain.

PDCCH acting as a physical downlink control channel is allocated to N first OFDM symbols of a subframe. In this case, N is an integer of 1 or higher and is indicated by a PCFICH. PDCCH includes one or more CCEs. PDCCH may inform each UE or a UE group of information related to resource allocation of PCH (Paging Channel) and DL-SCH (Downlink-shared channel), uplink scheduling grant, HARQ information, etc. The PCH and the DL-SCH are transmitted through a PDSCH. Therefore, the BS and the UE may transmit and receive data other than either specific control information or specific service data through the PDSCH.

Information indicating which one of UEs will receive data as an input, information indicating how the UEs receive PDSCH data, and information indicating whether the decoding is carried out are contained in the PDCCH. For example, it is assumed that a specific PDCCH is CRC-masked with a Radio Network Temporary Identity (RNTI) called 'A', and information that is transmitted using radio resources 'B' (for example, a frequency location) and transmission format information 'C' (for example, a transmission block size, a modulation scheme, coding information, etc.), is transmitted through a specific subframe. In this case, a UE located in a cell monitors PDCCH using its own RNTI information. If at least one UE having the RNTI 'A' is present, the UEs receive PDCCH and receive PDSCH indicated by 'B' and 'C' through the received PDCCH information.

In the meantime, if a channel condition between the base station (BS) and the UE is poor, a relay node (RN) is installed between the BS and the UE such that it can provide an RF channel having superior channel conditions to the UE. In addition, a relay node (RN) is introduced to a cell edge region having a poor channel condition such that it can provide a higher-speed data channel and can extend a cell service region. As described above, the relay node (RN) has been widely used to solve the propagation shade region in a wireless communication system.

Compared to the conventional art that is restricted to functions of a repeater capable of amplifying/transmitting a signal, the latest technology is being developed to cover more intelligent techniques. Furthermore, the relay node (RN) technology can reduce costs associated with increasing the number of BSs and maintenance costs of a backhaul network in next generation mobile communication systems, and is requisite for extending the service coverage simultaneously while increasing the data processing rate. With the increasing development of relay node (RN) technology, the necessity for the relay node (RN) used in the conventional wireless communication system to be supported by the new wireless communication system is also increasing.

As the technology for forwarding a link connection between the BS and the UE is introduced to a relay node (RN) in a $3^{rd}$ Generation Partnership Project Long Term Evolution-Advanced (3GPP LTE-A) system, two links having different attributes are applied to a UL carrier frequency band and a DL carrier frequency band. The connection link between the BS and the RN is defined as a backhaul link. Transmission of data using downlink (DL) resources according to a Frequency Division Duplexing (FDD) or Time Division Duplexing (TDD) scheme is referred to as backhaul downlink. Transmission of data using uplink (UL) resources according to the FDD or TDD scheme is referred to as backhaul uplink.

Figure 6:
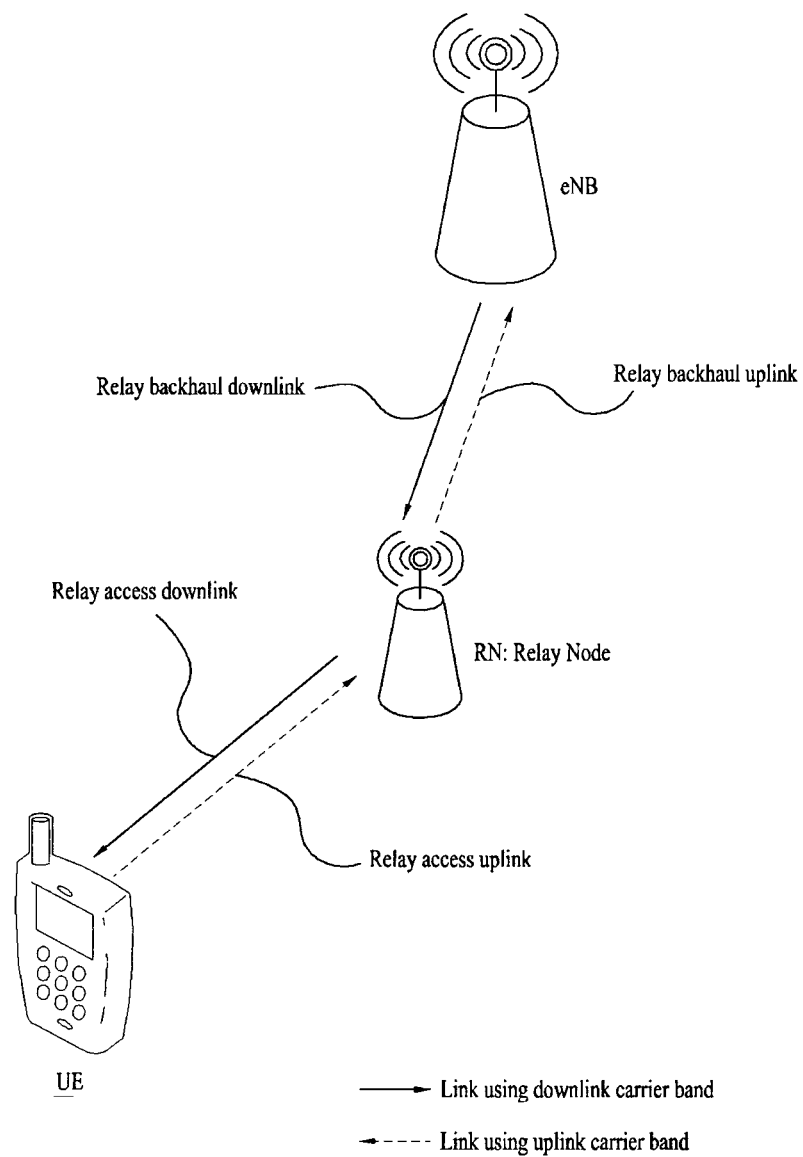
FIG. 6 is a conceptual diagram illustrating a relay backhaul link and a relay access link for use in a wireless communication system.

FIG. 6 is a conceptual diagram illustrating a relay backhaul link and a relay access link for use in a wireless communication system.

Referring to FIG. 6, as the relay node (RN) is introduced to perform forwarding of link connection between the BS and the UE, two links having different attributes are applied to a UL carrier frequency band and a DL carrier frequency band. The connection link between the BS and the RN is defined as a backhaul link. Transmission of a backhaul link using either resources of a downlink frequency band (i.e., the case of Frequency Division Duplex (FDD)) or resources of a downlink subframe (i.e., the case of Time Division Duplexing (TDD)) is referred to as backhaul downlink. Transmission of backhaul link using either resources of an uplink frequency band (i.e., the case of FDD) or resources of an uplink subframe (i.e., the case of TDD) is referred to as backhaul uplink.

On the other hand, the connection link between the relay node (RN) and a series of UEs is defined as a relay access link. If the relay access link is transmitted using resources of the downlink frequency band (i.e., the case of FDD) or resources of a downlink subframe (i.e., the case of TDD), the above-mentioned transmission operation is denoted by an access downlink. Otherwise, if the relay access link is transmitted using resources of the uplink frequency band (i.e., the case of FDD) or resources of an uplink subframe (i.e., the case of TDD), the above-mentioned transmission operation may be represented by an access uplink.

The RN may receive information from the BS through a relay backhaul downlink, and may transmit information to the BS through a relay backhaul uplink. In addition, the relay node may transmit information to the UE through the relay access downlink, or may receive information from the UE through the relay access uplink.

Meanwhile, in association with the band (or spectrum) of the relay node (RN), one case in which the backhaul link operates in the same frequency band as in the access link is referred to as 'in-band', and the other case in which the backhaul link operates in a frequency band different from that of the access link is referred to as 'out-band'. In the above-mentioned two cases of in-band and out-band, it is necessary for a UE (hereinafter referred to as a legacy UE) that is operated in the legacy LTE system (for example, Release-8) to access a donor cell.

Relay nodes (RNs) can be classified into a transparent RN and a non-transparent RN according to whether or not the UE recognizes the RN. The transparent RN indicates an exemplary case in which it is impossible to recognize whether the UE communicates with a network through the RN, and the non-transparent RN indicates another exemplary case in which it is possible to recognize whether the UE communicates with a network through the RN.

In relation to the RN control, RNs can be classified into a relay node serving as a part of a donor cell and another relay node capable of controlling a cell alone.

Although the relay node serving as a part of the donor cell may have an RN identifier (ID), the RN does not have a unique cell identity. If Radio resource Management (RPM) is partially controlled by the BS including the donor cell (although the remaining parts of RPM are located in the RN), the above-mentioned RN is considered to be a relay node (RN) serving as a part of the donor cell. Preferably, the above-mentioned RN may support the legacy UE. For example, smart repeaters, decode-and-forward relay nodes, a variety of L2 ($2^{nd}$ layer) RNs, and Type-2 RNs may be allocated to the above-mentioned RN.

According to the relay node (RN) capable of controlling the cell alone, this RN controls one or more cells, provides a unique physical layer cell identity to each cell controlled by the RN, and is able to use the same RPM mechanism. From the viewpoint of the UE, there is no difference between accessing a cell controlled by the RN and accessing a cell controlled by a general BS. Preferably, cells controlled by the above-mentioned RNs may support the legacy UE. For example, a Self-backhauling RN, L3 ($3^{rd}$ layer) RN, Type-1 RN, and Type-1a RN may be allocated to the above-mentioned RN.

The Type-1 RN controls a plurality of cells using In-band RN, and the UE considers each cell to be a separate cell distinguished from the donor cell. In addition, several cells are assigned respective physical cell IDs (defined in LTE Release-8), and the RN may transmit its own synchronization channel, a reference signal, and the like. In the case of single-cell operation, the UE can directly receive scheduling information and HARQ feedback from the RN, and can transmit its own control channel information (scheduling request (SR), CQI, ACK/NACK, etc.) to the RN. In addition, the legacy UE (that is operated according to LTE Release-8) considers Type-1 RN to be a legacy BS (that is operated according to LTE Release-8). That is, the Type-1 RN has backward compatibility. On the other hand, from the viewpoint of a UE that is operated according to the LTE-A system, the Type-1 RN is considered to be different from the legacy BS, resulting in improved performance or throughput.

The Type-1a RN is operated in the out-band, and has the same characteristics as those of the Type-1 RN. The Type-1a RN operation may be configured to minimize (or eliminate) the influence of L1 ($1^{st}$ layer) operation.

The Type-2 RN may be an In-band RN, does not have a separate physical cell ID, and does not form a new cell. The Type-2 RN considers the legacy IE to be transparent, and the legacy UE is unable to recognize the presence of the Type-2 RN. Although the Type-2 RN transmits PDSCH, it should be noted that the Type-2 RN does not transmit CRS and PDCCH.

On the other hand, in order for the RN to operate in the in-band, some resources for use in the time-frequency domains must be reserved for a backhaul link and these resources may not be used for the access link. The above-mentioned resource definition is called 'resource partitioning'.

General principles related to resource partitioning in the relay node (RN) will be given below. The backhaul downlink and the access downlink can be multiplexed in one carrier frequency according to the Time Division Multiplexing (TDM) scheme (that is, only one of the backhaul downlink and the access downlink can be activated at a specific time). Similar to this, the backhaul uplink and the access uplink can be TDM-multiplexed in one carrier frequency according to the TDM scheme (that is, only one of the backhaul uplink and the access uplink can be activated at a specific time).

In association with the backhaul link multiplexing based on the FDD scheme, backhaul downlink transmission is carried out in a downlink frequency band, and backhaul uplink transmission is carried out in an uplink frequency band. In association with the backhaul link multiplexing based on the TDD scheme, backhaul downlink transmission is carried out in a downlink subframe of the BS and the RN, and backhaul uplink transmission is carried out in an uplink subframe of the BS and the RN.

In the case of In-band RN, provided that backhaul downlink is received from the BS within a predetermined frequency band and at the same time access downlink is transmitted to the UE within the same frequency band, a signal transmitted from the transmitter of the RN may be received from the receiver of the RN, such that signal interference or RF jamming may occur in the RF front-end of the RN. Similar to this, assuming that the access uplink is received from the UE within a predetermined frequency band and at the same time the backhaul uplink is transmitted to the BS within the same frequency band, signal interference may occur in the RF front-end of the RN. Therefore, the present invention has difficulty in implementing simultaneous transmission/reception within one frequency band of the RN on the condition that a reception (Rx) signal and a transmission (Tx) signal are not spaced apart from each other (for example, the Tx antenna and the Rx antenna are not geographically spaced apart from each other (e.g., one of the Tx and Rx antennas is installed on the ground one is installed underground)).

A method for obviating the above-mentioned signal interference controls the RN not to transmit a signal to the UE while the RN receives a signal from the donor cell. In other words, a gap may occur in transmission from the RN to the UE, and the UE (including the legacy UE) may be set not to receive any data from the RN during the gap. The above-mentioned gap may be established by constructing a Multicast Broadcast Single Frequency Network (MBSFN) subframe.

Figure 7:
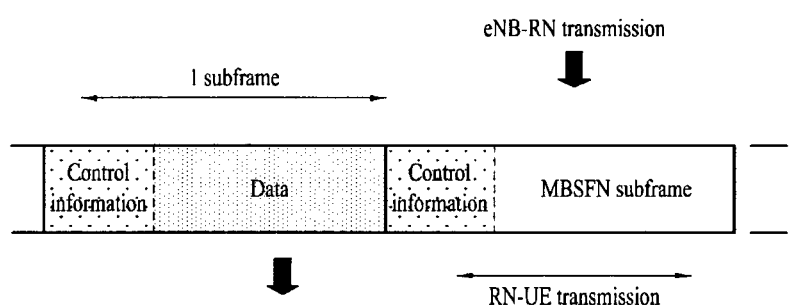
FIG. 7 illustrates an example of relay node (RN) resource partitioning.

FIG. 7 illustrates an example of relay node (RN) resource partitioning.

Referring to FIG. 7, the first subframe is a general subframe, and transmits a downlink (i.e., an access downlink) control signal and data from the RN to the UE. The second subframe is an MBSFN subframe. While a control signal is transmitted from the RN to the UE in the control region of the downlink subframe, no signal is transmitted from the RN to the UE in the remaining region of the downlink subframe. Here, since the legacy UE expects transmission of PDCCH through all downlink subframes (that is, it is necessary for legacy UEs contained in the RN coverage to receive PDCCH at every subframe and then perform a measurement function), it is necessary for the PDCCH to be transmitted through all the downlink subframes in order for each legacy UE to be correctly operated. Therefore, on a subframe (i.e., a second subframe) established for downlink (i.e., backhaul downlink) transmission from the BS to the RN, the RN needs to perform transmission of access downlink instead of reception of backhaul downlink in the first N OFDM symbols (N=1, 2 or 3). In this case, since PDCCH is transmitted from the RN to the UE in the control region of the second subframe, the RN can provide backward compatibility for the serving legacy UE. While no signal is transmitted from the RN to the UE in the remaining regions of the second subframe, the RN can receive data or signals from the BS. Therefore, the above-mentioned resource partitioning scheme can prevent the access downlink transmission and the backhaul downlink reception from being simultaneously carried out in the in-band RN.

A second subframe that utilizes the MBSFN subframe will hereinafter be described in detail. The control region of the second subframe may be referred to as a relay node (RN) non-listening interval (also called a non-hearing interval). During the RN non-listening interval, the RN can transmit an access downlink signal without receiving a backhaul downlink signal. As described above, the RN non-listening interval may include the length of one OFDM, the length of two OFDMs or the length of three OFDMs. During the RN non-listening interval, the RN transmits access downlink to the UE. In the remaining regions, the RN can receive the backhaul downlink from the BS. In this case, the RN cannot simultaneously transmit and receive data in the same frequency band, such that time is unnecessarily consumed for the RN that transitions from a transmission (Tx) mode to a reception (Rx) mode. Accordingly, it is necessary to establish a guard time (GT) in such a manner that the RN can perform Tx/Rx mode switching in some parts of the first interval of the backhaul downlink Rx region. Similar to this operation, even when the RN receives backhaul downlink from the BS and operates to transmit the access downlink to the UE, a guard time (GT) for Tx/Rx mode switching of the RN can be established. The length of such a GT may be defined as a value of a time domain. For example, the length of GT may be defined as k (k≥1) time samples (Ts) or may be set to the length of one or more OFDM symbols. Alternatively, if the RN backhaul downlink subframes are successively established, the guard time (GT) of the last part of the subframe may be defined or not established. In addition, the guard time (GT) of the last part of the subframe may also be defined or not established according to the relationship of timing alignment of a predetermined subframe. In order to maintain backward compatibility, the GT may be defined only in a frequency domain established for backhaul downlink subframe transmission (in the case where the GT is established in the access downlink interval, it is impossible to support the legacy UE). In the backhaul downlink Rx interval other than the guard time (GT), the RN is able to receive PDCCH and PDSCH from the BS. From the viewpoint of an RN dedicated physical channel, the received PDCCH and the received PDSCH may also be represented by Relay-PDCCH (R-PDCCH) and R-PDSCH (Relay-PDSCH), respectively.

Figure 8:
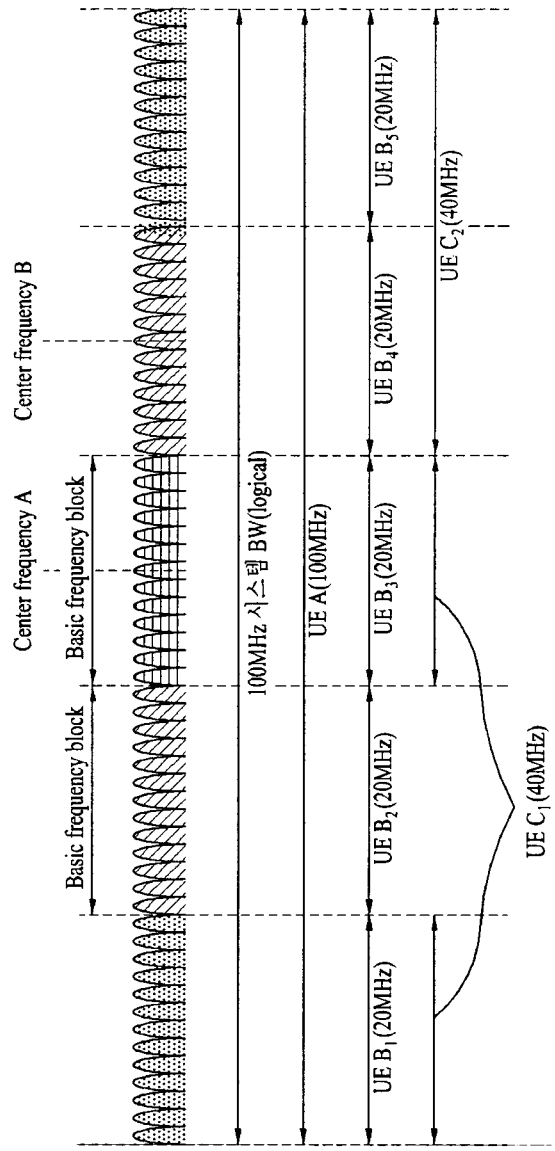
FIG. 8 is a conceptual diagram of a carrier aggregation scheme.

Carrier aggregation will hereinafter be described in detail. FIG. 8 exemplarily shows carrier aggregation.

Carrier aggregation refers to a method for allowing a UE to use a plurality of frequency blocks or (logical) cells, each of which is composed of uplink resources (or CCs) and/or downlink resources (or CCs), as one large logical band so as to provide a wireless communication system with a wider frequency bandwidth. For convenience of description and better understanding of the present invention, carrier aggregation will hereinafter be referred to as a component carrier (CC).

Referring to FIG. 8, the entire system bandwidth (System BW) includes a bandwidth of 100 MHz as a logical bandwidth. The entire system bandwidth (system BW) includes five component carriers (CCs) and each CC has a maximum bandwidth of 20 MHz. The CC includes one or more physically contiguous subcarriers. Although all CCs have the same bandwidth in FIG. 8, this is only exemplary and the CCs may have different bandwidths. Although the CCs are shown as being contiguous in the frequency domain in FIG. 8, FIG. 8 merely shows the logical concept and thus the CCs may be physically contiguous or separated.

Different center frequencies may be used for the CCs or one common center frequency may be used for physically contiguous CCs. For example, in FIG. 8, if it is assumed that all CCs are physically contiguous, a center frequency A may be used. If it is assumed that CCs are not physically contiguous, a center frequency A, a center frequency B and the like may be used for the respective CCs.

In the present specification, the CC may correspond to a system band of a legacy system. By defining the CC based on the legacy system, it is possible to facilitate backward compatibility and system design in a radio communication environment in which an evolved UE and a legacy UE coexist. For example, if the LTE-A system supports carrier aggregation, each CC may correspond to the system band of the LTE system. In this case, the CC may have any one bandwidth such as 1.25, 2.5, 5, 10 or 20 MHz.

In the case in which the entire system band is extended by carrier aggregation, a frequency band used for communication with each UE is defined in CC units. A UE A may use 100 MHz which is the bandwidth of the entire system band and perform communication using all five CCs. Each of UEs $B_1$ to $B_5$ may only use a bandwidth of 20 MHz and perform communication using one CC. Each of UEs $C_1$ and $C_2$ may use a bandwidth of 40 MHz and perform communication using two CCs. The two CCs may be contiguous or non-contiguous. The UE $C_1$ uses two non-contiguous CCs and the UE $C_2$ uses two contiguous CCs.

One downlink CC and one uplink CC may be used in the LTE system and several CCs may be used in the LTE-A system as shown in FIG. 8. At this time, a method of scheduling a data channel by a control channel may be divided into a linked carrier scheduling method and a cross carrier scheduling method.

More specifically, in the linked carrier scheduling method, similarly to the LTE system using a single CC, a control channel transmitted via a specific CC schedules only a data channel via the specific CC.

In contrast, in the cross carrier scheduling method, a control channel transmitted via a primary CC using a carrier indicator (CI) schedules a data channel transmitted via the primary CC or another CC.

The present invention provides a method for effectively designating reference resources reporting aperiodic channel state information (CSI) on the condition that carrier aggregation is applied to a backhaul link between a macro eNode-B (MeNB) and a relay node (RN). It should be noted that the following method can be applicable not only to a location between an RN and an RN UE (RUE), but also to another location between an MeNB and an MeNB UE (MUE).

Prior to describing the present invention, the 3GPP LTE system standard documents have defined CQI reference resources as shown in the following Table 1.

TABLE 1

The CQI reference resource is defined as follows:

- In the frequency domain, the CQI reference resource is defined by the group of downlink physical resource blocks corresponding to the band to which the derived CQI value relates.
- In the time domain, the CQI reference resource is defined by a single downlink subframe $n-n_{CQI\_ref}$.
    - where for periodic CQI reporting $n_{CQI\_ref}$ is the smallest value greater than or equal to 4, such that it corresponds to a valid downlink subframe;
    - where for aperiodic CQI reporting $n_{CQI\_ref}$ is such that the reference resource is in the same valid downlink subframe as the corresponding CQI request in an uplink DCI format.
    - where for aperiodic CQI reporting $n_{CQI\_ref}$ is equal to 4 and downlink subframe $n-n_{CQI\_ref}$ corresponds to a valid downlink subframe, where downlink subframe $n-n_{CQI\_ref}$ is received after the subframe with the corresponding CQI request in a Random Access Response Grant.
    A downlink subframe shall be considered to be valid if:
    - ■ it is configured as a downlink subframe for that UE, and
    - ■ except for transmission mode 9, it is not an MBSFN subframe, and
    - ■ it does not contain a DwPTS field in case the length of DwPTS is $7680 \cdot T_s$ and less, and
    - ■ it does not fall within a configured measurement gap for that UE.
    If there is no valid downlink subframe for the CQI reference resource, CQI reporting is omitted in uplink subframe n.
- In the layer domain, the CQI reference resource is defined by any RI and PMI on which the CQI is conditioned.

In Table 1, a reference resource for transmitting CQI reporting at the n-th uplink subframe is defined as a single valid downlink subframe indexed with $n-n_{CQI\_ref}$. In this case, the valid downlink subframe indicates a downlink subframe established in the UE or RN. Specifically, in case of the aperiodic CQI reporting, a downlink subframe indexed with $n-n_{CQI\_ref}$ is established in the same manner as in a downlink subframe in which a CQI request is achieved through a DCI format. In addition, if there is no valid downlink subframe, the above-mentioned CQI reporting is omitted.

However, 8-bit sized bitmap information for establishing a downlink subframe in a backhaul link of an FDD system to which carrier aggregation is applied may be independently established per cell (or per CC). Alternatively, 8-bit sized bitmap information may be equally established in some cells (or some CCs), or may be independently established in the remaining cells (or the remaining CCs) through RRC signaling. In this case, aperiodic CSI reporting of a secondary cell (SCell) can be triggered using cross carrier scheduling in a PDCCH (more particularly, DCI format 0, DCI format 4) transmitted through a primary downlink CC (i.e., a primary cell PCell). In this case, according to conventional reference resource definition shown in Table 1, aperiodic CSI report triggering may be different from those of reference resources of actual target cells (or CCs), resulting in the occurrence of unexpected problems. A detailed description thereof will hereinafter be described in detail.

Figure 9:
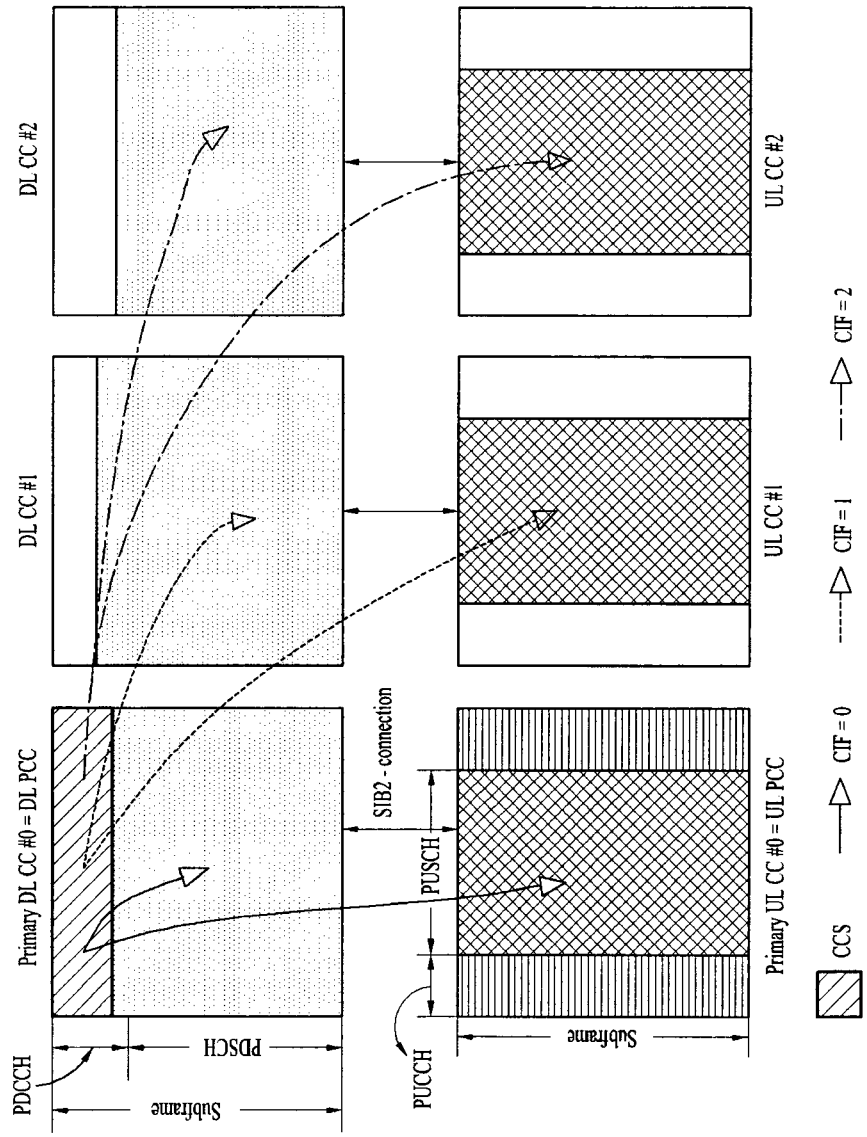
FIG. 9 is a conceptual diagram of a cross carrier scheduling scheme.

FIG. 9 is a conceptual diagram of a cross carrier scheduling scheme. Specifically, as can be seen from FIG. 9, the number of cells (or CCs) allocated to a relay node (RN) is set to 3, cross carrier scheduling is carried out using a CIF as described above. In this case, it is assumed that a downlink cell (or CC) #0 and an uplink cell (or CC) #0 are set to a primary downlink CC (i.e., a primary cell PCell) and a primary uplink CC, respectively, and the remaining CCs are used as a secondary cell (SCell).

Figure 10:
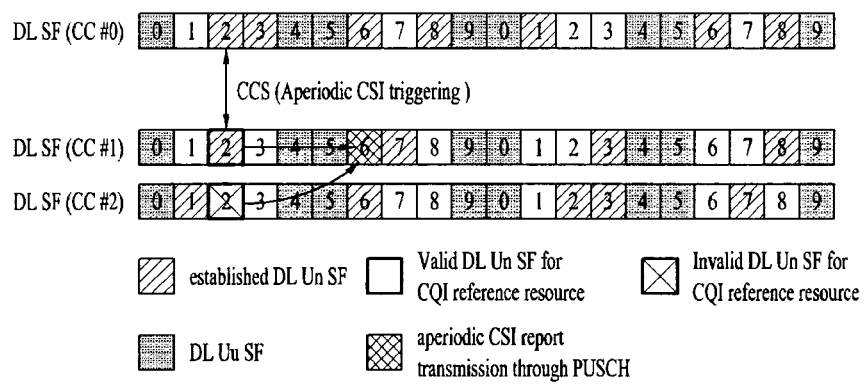
FIG. 10 shows problems encountered in a frequency division duplex (FDD) system based on conventional CSI reference resource definition.

FIG. 10 shows problems encountered in a frequency division duplex (FDD) system based on conventional CSI reference resource definition. Specifically, compared to the cross carrier scheduling shown in FIG. 9, FIG. 10 assumes that a 8-bit sized bitmap for establishing a downlink subframe per CC in a backhaul link is independently RRC-signaled, and aperiodic CSI reporting of a secondary CC is triggered in a primary CC.

In addition, FIG. 10 assumes that 8-bit sized bitmaps for establishing individual backhaul downlink subframes of a CC #0, a CC #1 and a CC #2 are set to '10110010', '00100101', and '01001110', respectively.

Referring to FIG. 10, a macro eNode-B (MeNB) allocates the remaining downlink subframes other than subframes #0, #4, #5 and #9 used as access downlink subframes from among downlink subframes designated in the 8-bit sized bitmap information of the CC #0 are established as backhaul downlink subframes. In this case, the MeNB can recognize that aperiodic CSI reporting of the CC #1 is triggered through cross carrier scheduling at a subframe #2 from among the above backhaul downlink subframes.

In addition, it is assumed that aperiodic CSI report triggering of the CC #1 is performed using a 2-bit field of a DCI format 4, and shows the operations for generating/reporting a CSI of a downlink CC assigned to an RRC when a triggering bit is set to '10'. In this case, it is assumed that the downlink CCs assigned to an RRC of the CC #1 corresponding to the triggering bit '10' are set to DL CC #1 and DL CC #2. For reference, the triggering bit prescribed in the 3GPP TS 36.213 is defined by the following Table 2.

TABLE 2

| Value of CSI request field | Description |
|---|---|
| '00' | No aperiodic CSI report is triggered |
| '01' | Aperiodic CSI report is triggered for serving cell c |
| '10' | Aperiodic CSI report is triggered for a $1^{st}$ set of serving cells configured by higher layers |
| '11' | Aperiodic CSI report is triggered for a $2^{nd}$ set of serving cells configured by higher layers |

In Table 2, '01' indicates transmission of aperiodic CSI of a downlink CC that performs cross carrier scheduling using the corresponding triggering bit. Meanwhile, an eNB can previously inform a UE of an aggregation (i.e., a first carrier aggregation or a second carrier aggregation) of downlink (DL) CCs for transmission of aperiodic CSI on the condition that the triggering bit '10' or '11' is received through higher layer signaling for a specific secondary CC. Thereafter, if the UE receives the aperiodic CSI triggering bits '10' and '11' of the specific secondary CC through a primary CC, the UE transmits aperiodic CSI of the first or second carrier aggregation through the specific secondary CC in an uplink subframe of the specific secondary CC.

In this case, a relay node (RN) must simultaneously transmit CSI of a DL CC #1 and CSI of a DL CC #2 through an uplink subframe #6 (corresponding to a PUSCH of an uplink CC #1). However, differently from the CC #1, it is impossible for the CC #2 to use a DL subframe #2 acting as a reference resource to be referred for aperiodic CSI generation.

Therefore, according to the conventional CSI reference resource definition, the relay node (RN) transmits only CSI of the DL CC #1 through a PUSCH of an uplink CC #1 (i.e., an uplink subframe #6 of the CC #1). In other words, CSI reporting of the DL CC #2 is omitted.

The present invention provides a method for effectively solving the CSI reporting omission problem caused by backhaul DL subframe setting that is differently achieved in individual CCs, under the condition that aperiodic CSI reporting of another secondary CC is triggered through cross carrier scheduling in a primary CC.

<First Embodiment>

According to a first embodiment of the present invention, a reference resource of an actual target CC of the aperiodic CSI reporting of the FDD system is shifted to the nearest subframe (established as a backhaul DL subframe) from a reception time of the above triggering. In this case, the backhaul DL subframe indicates the remaining subframes other than DL subframes #0, #4, #5 and #9 used as access DL subframes from among DL subframes designated through the 8-bit sized bitmap.

Preferably, the above-mentioned expression "the nearest subframe established as a backhaul DL subframe from a reception time of the triggering" may be limited to the nearest backhaul DL subframe #m (where m≤n) related to a previous time including a DL subframe #n from the above triggering reception time (e.g., DL subframe #n).

Provided that the DL subframe in which aperiodic CSI report triggering is received is not valid in another specific CC, the CSI reference resource may be designated as the nearest backhaul DL subframe other than the DL subframe in which the above triggering is received.

Figure 11:
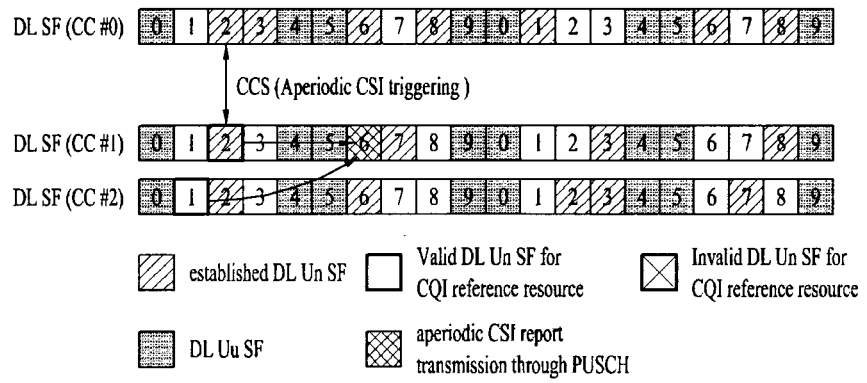
FIG. 11 shows an example for performing aperiodic CSI reporting by an FDD system according to a first embodiment of the present invention.

FIG. 11 shows an example for performing aperiodic CSI reporting by an FDD system according to a first embodiment of the present invention.

Referring to FIG. 11, a reference resource for CSI reporting of a DL CC #2 is shifted to a DL subframe #1 at a DL SF #2, such that the relay node (RN) can simultaneously transmit not only CSI of the DL CC #1 but also CSI of the DL CC #2 through a subframe #6 (i.e., PUSCH) of the UL CC #1. Therefore, the first embodiment of the present invention can solve the problem in which CSI reporting of some CCs is dropped because of inconsistency of reference resources of individual CCs.

In addition, the problem encountered in the FDD system of FIG. 10 may also occur not only in one case in which 'SubframeConfigurationTDD' is differently assigned to individual CCs established by a higher layer of a TDD system, but also in another case in which aperiodic CSI reporting is triggered through cross carrier scheduling at a primary CC.

Figure 12:
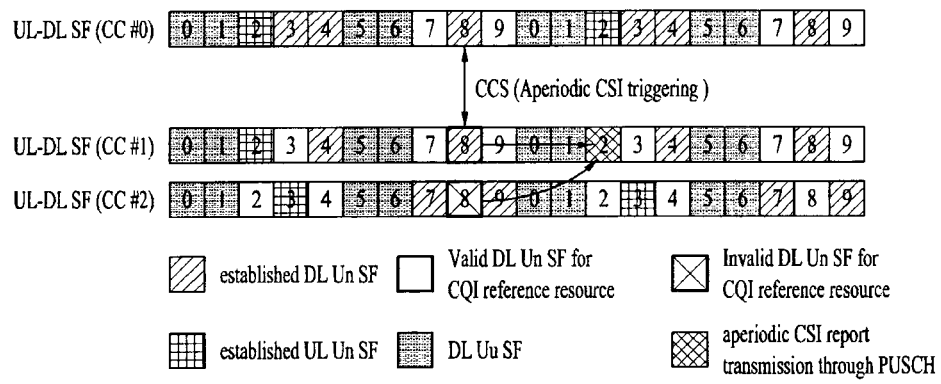
FIG. 12 shows problems encountered in a time division duplex (TDD) system based on conventional CSI reference resource definition.

FIG. 12 shows problems encountered in a time division duplex (TDD) system based on conventional CSI reference resource definition.

Specifically, it is assumed that 'SubframeConfiguration-TDD' values of CC #0, CC #1 and CC #2 are set to '9', '7' and '11', respectively. It is also assumed that a macro eNB (MeNB) triggers aperiodic CSI backhaul downlink subframe #8 in which backhaul link communication of the CC #0 can be achieved.

In addition, it is assumed that aperiodic CSI report triggering of the CC #1 is performed using the 2-bit field of the DCI format 4. Specifically, the above aperiodic CSI report triggering shows operations for generating/reporting CSI on the condition that a triggering bit is set to '11'. In this case, it is assumed that a DL CC established as an RRC of a CC #1 corresponding to the triggering bit '11' is identical to DL CC #1 and DL CC #2.

Referring to FIG. 12, the relay node (RN) must simultaneously transmit CSI of the DL CC #1 and CSI of the DL CC #2 through a PUSCH of a UL CC #1 (i.e., UL subframe #2 of the CC #1). However, differently from the CC #1, it is impossible for the CC #2 to use a DL subframe #8 acting as a reference resource to be referred for aperiodic CSI generation.

Therefore, according to the conventional CSI reference resource definition, the relay node (RN) transmits only CSI of the DL CC #1 through a PUSCH of an UL CC #1 (i.e., UL subframe #2 of the CC #1). In other words, CSI reporting of the DL CC #2 is omitted.

The present invention provides a method for effectively solving the CSI reporting omission problem caused by different SubframeConfigurationTDD values of individual CCs.

According to a first embodiment of the present invention, a reference resource of an actual target CC of the aperiodic CSI reporting of the TDD system is shifted to the nearest subframe (established as a backhaul DL subframe) from a reception time of the above triggering. Preferably, the above-mentioned expression "the nearest subframe established as a backhaul DL subframe from a reception time of the triggering" may be limited to the nearest backhaul DL subframe #m (where m n) related to a previous time including a DL subframe #n from the above triggering reception time (e.g., DL subframe #n).

Furthermore, in association with the FDD system and the TDD system, a specific DL subframe corresponding to a reference resource to be shifted includes a DL subframe #(k−4) from an UL subframe #k in which actual CSI reporting is generated. If necessary, the specific DL subframe may also be limited to the nearest backhaul DL subframe #p (where p≤(k−4)). The above-mentioned limitation may also be applied not only to aperiodic CSI reporting but also periodic CSI reporting.

Figure 13:
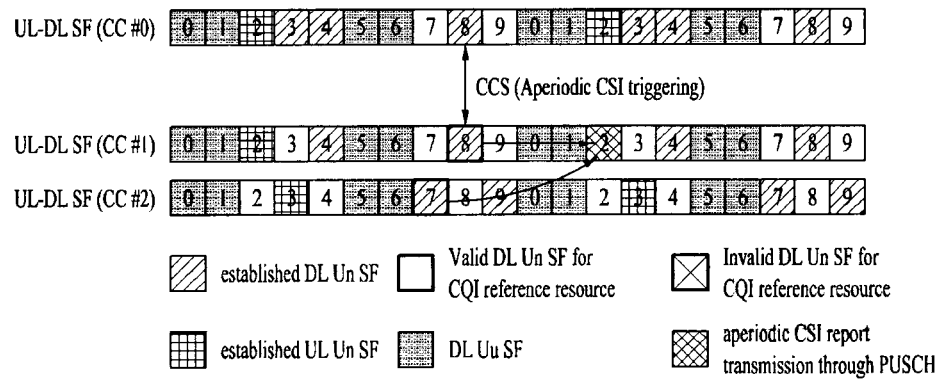
FIG. 13 shows an example for performing aperiodic CSI reporting by a TDD system according to a first embodiment of the present invention.

FIG. 13 shows an example for performing aperiodic CSI reporting by a TDD system according to a first embodiment of the present invention.

Referring to FIG. 13, a reference resource for CSI reporting of a DL CC #2 is shifted to a DL subframe #1 at a DL subframe #8, such that the relay node (RN) can simultaneously transmit not only CSI of the DL CC #1 but also CSI of the DL CC #2 through a subframe #2 (i.e., PUSCH) of the CC #1.

Meanwhile, in association with the FDD system and the TDD system, the relay node (RN) recognizes backhaul DL subframe configuration information for each CC, such that it can previously recognize whether a subframe designated as a reference resource is shifted or not. Therefore, the relay node (RN) may preferably store the measurement result of the nearest subframe to be shifted.

Alternatively, a command for enabling the MeNB to store the measurement result of the nearest subframe to be shifted may be signaled to the relay node (RN). Here, signaling may be implemented through higher layer signaling, or may also be implemented by the MeNB that informs the relay node (RN) of such signaling through a specific field or specific resource of information transmitted over a PDCCH or PDSCH.

Furthermore, the above-mentioned signaling may be configured in such a manner that indexes of subframes where the measurement result is to be stored from among the nearest subframes to be shifted are directly notified using a bitmap format, or may be configured in a command by which all the measurement results of the nearest subframes to be shifted are stored or not stored through a 1-bit sized indicator.

In addition, provided that the shifted backhaul DL subframe is identical to a subframe designated as a reference resource for aperiodic (or periodic) CSI reporting, the triggered aperiodic CSI reporting may be dropped.

The first embodiment of the present invention can also be applied not only to an environment in which CCs allocated to the relay node (RN) are operated in the FDD or TDD system, but also to another environment in which some CCs are operated in the FDD system and the remaining CCs are operated in the TDD system.

In addition, the first embodiment of the present invention can be applied not only to the operation of a backhaul link between an MeNB and an RN, but also to the operations of an MeNB and an MUE. That is, all DL subframes for use in the FDD system can be used as candidate DL subframes capable of being used for communication between the MeNB and the MUE. In addition, all DL subframes for use in the TDD system can also be applied to a conventional UL-DL subframe configuration. Furthermore, the present invention can also be applied to a dynamic subframe (SF) configuration.

<Second Embodiment>

Many developers and companies associated with the LTE-A system are conducting intensive research into the enhanced Inter Cell Interference Coordination (eICIC) for reducing interference between a first eNB (eNB1) and a second eNB (eNB2) in a heterogeneous network (HetNet) of the LTE-A system. A representative example thereof is an almost blank subframe (ABS), and it is possible to transmit only a CRS within a subframe designated as the ABS.

The above-mentioned embodiment, under the condition that an ABS pattern for each cell (or each CC) is independently established in individual cells (or individual CCs) or some cells (or some CCs) are equally established and the remaining cells are established independently of one another, can also be applied to resource specific measurement (e.g., restricted CSI measurement) of the UE or RN. The 3GPP LTE system has defined the resource specific measurement as shown in the following table 3.

Therefore, if aperiodic CSI reporting of another secondary CC is triggered through cross carrier scheduling in a primary CC, reference resources of actual target secondary CCs according to the conventional CSI reporting reference resource definition may not belong to the restricted CSI measurement set of the above secondary CC, and as such a detailed description thereof will hereinafter be described with reference to the attached drawings.

Figure 14:
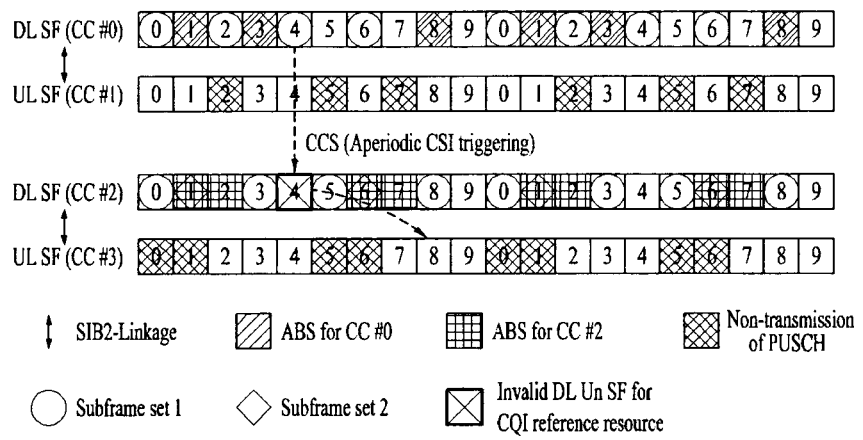
FIG. 14 shows problems caused by conventional CSI reference resource definition on the condition that an almost blank subframe (ABS) pattern per component carrier (CC) and a restricted CSI measurement set per CC are independently established in an FDD system.

FIG. 14 shows problems caused by conventional CSI reference resource definition on the condition that an almost blank subframe (ABS) pattern per CC and a restricted CSI measurement set per CC are independently established in the FDD system.

Specifically, as can be seen from FIG. 14, a total number of CCs assigned to a UE is set to 4, it is assumed that a DL cell (or CC) #0 and a UL cell (or CC) #1 are identical to a primary DL CC (i.e., PCell) and a primary UL CC, respectively, and it is also assumed that the remaining CCs are identical to a secondary CC (i.e., SCell).

In addition, the MeNB assumes that aperiodic CSI reporting of a CC #2 is triggered through cross carrier scheduling at a DL subframe #4 corresponding to a subframe set 1 serving as either a non-ABS of a CC #0 or a subframe set 1 for the restricted CSI measurement. In this case, it is assumed that aperiodic CSI report triggering of the CC #2 is performed using a 2-bit field of a DCI format 4, and shows the operations for generating/reporting a CSI when a triggering bit is set to '01'. In this case, the triggering bit '01' indicates the operations for generating/reporting CSI of a DL cell (or CC) where aperiodic CSI reporting is triggered, and it is assumed that a DL CC corresponding to the triggering bit '01' is identical to a DL CC #2.

Referring to FIG. 14, a UE must transmit CSI of a DL CC #2 through a UL subframe #8 of a CC #3. However, a DL subframe #4 to be referred for aperiodic CSI generation at the CC #2 is not contained in the subframe set 1 or 2 for the restricted CSI measurement of the CC #2.

TABLE 3

■ Resource specific measurement
- ➢ If the UE cannot distinguish ABS and non-ABS, the UE will average out the fluctuation of the interference level
    - ✓ An inaccurate measurement result will be reported
        - ● Even the connectivity may be lost with declaring the radio link failure (RLF)
- ➢ "Resource specific" measurement is necessary
- ➢ The serving eNB informs the victim UE of the "set of subframes" to which the UE measurement should be restricted
- ➢ "Subframe set 1" for
    - ✓ RLM (radio link monitoring); to check the current connection is reliable enough
    - ✓ RRM (radio resource management); for handover decision
        - ● RSRQ (reference signal received quality)
            - Additional set can be signaled for the measurement for some neighboring cells
        - ● Relatively static configuration
- ➢ "Subframe set 2" for
    - ✓ CSI reporting; for link adaptation
        - ● Two sets are signaled for two different CSI types
            - E.g., one for ABS and the other for non-ABS
    - ✓ Relatively dynamic configuration Referring to Table 3, an ABS pattern for each cell (or each CC) is independently established in individual cells (or individual CCs) or some cells (or some CCs) are equally established and the remaining cells (or the remaining CCs) are established independently of one another, such that the restricted CSI measurement sets (i.e., subframe set 1 and subframe set 2) for each cell (or each CC) may have different positions.

Accordingly, the UE omits or drops the CSI reporting of the CC #2. In addition, this problem may also occur in the TDD system in which DL communication and UL communication are performed in the same frequency band.

According to a second embodiment of the present invention, reference resources of actual target CC of the aperiodic CSI report triggering are shifted to the nearest DL subframe #m (where m≤n) established as the restricted CSI measurement set of the secondary CC from a DL subframe #n indicating a reception time point of the above triggering.

Furthermore, a specific DL subframe corresponding to a reference resource to be shifted includes a DL subframe #(k−4) from an UL subframe #k in which actual CSI reporting is generated. If necessary, the specific DL subframe may also be limited to the nearest backhaul DL subframe #p (where p≤(k−4)) established as the restricted CSI measurement set of the previous secondary CC. The above-mentioned limitation may also be applied not only to aperiodic CSI reporting but also periodic CSI reporting.

In this case, the shifted valid DL subframe can be found in the subframe set 1 and/or the subframe set 2.

In addition, the aperiodic CSi report triggering may indicate information of the restricted CSI measurement set of actual target subcarriers. Information regarding the CSI measurement set can be transferred through higher layer signaling or L1/L2 signaling. In this case, MeNB may inform a UE of information regarding the restricted CSI measurement set of the actual target subcarrier through a specific field of a PDCCH (e.g., through a CIF or a UL index). Alternatively, the MeNB may also inform the UE of such information through additional field definition.

The above-mentioned scheme can also be extended to the periodic CSI reporting because it informs the UE of information regarding the restricted CSI measurement set of actual target subcarriers of the periodic CSI report triggering. For example, the above-mentioned scheme may inform the UE of information regarding the restricted CSI measurement set of actual target secondary CCs of the periodic CSI triggering through a specific PDCCH field (e.g., a CIF, a UL index field or a new additional field, etc.), prior to the actual execution time of the periodic CSI transmission.

Therefore, since the UE recognizes the restricted CSI measurement set, the UE can pre-recognize whether or not a subframe designated as a reference resource is shifted, such that the UE may preferably store the measurement result of the nearest shifted subframe. Alternatively, a command for enabling the MeNB to store the measurement result of the nearest subframe to be shifted may be signaled to the UE. Here, signaling may be implemented through higher layer signaling, or may also be implemented by the MeNB that informs the relay node (RN) of such signaling through a specific field or specific resource of information transmitted over a PDCCH or PDSCH. Likewise, the above-mentioned signaling may be configured in such a manner that indexes of subframes where the measurement result is to be stored from among the nearest subframes to be shifted are directly notified using a bitmap format, or may be configured in a command by which all the measurement results of the nearest subframes to be shifted are stored or not stored through a 1-bit sized indicator.

In addition, if a DL subframe where triggering is received is no longer valid in another CC, the MeNB may be shifted to a DL subframe, established as the nearest restricted CSI measurement set, other than the above DL subframe where the triggering is received.

Provided that the shifted DL subframe is identical to a subframe designated as a reference resource for periodic or aperiodic CSI reporting, the triggered aperiodic CSI reporting may be dropped.

Figure 15:
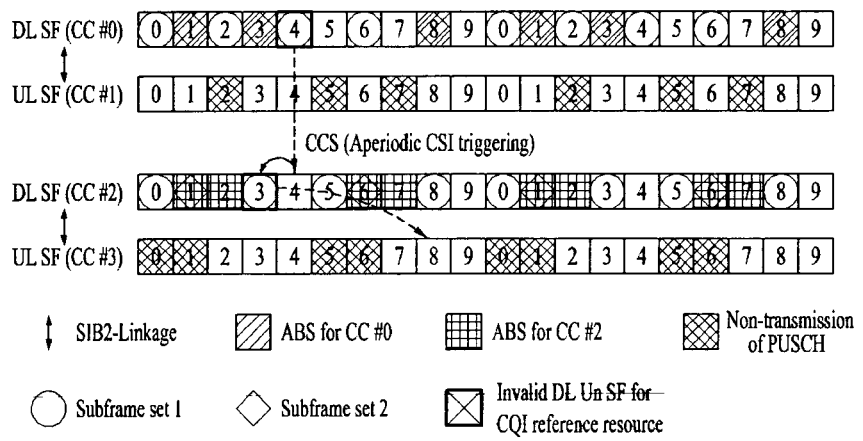
FIG. 15 shows an example of aperiodic CSI reporting on the condition that an ABS pattern per CC and a restricted CSI measurement set per CC are independently established according to a second embodiment of the present invention.

FIG. 15 shows an example of aperiodic CSI reporting on the condition that an ABS pattern per CC and a restricted CSI measurement set per CC are independently established according to a second embodiment of the present invention.

Referring to FIG. 15, it can be recognized that a reference resource for aperiodic CSI reporting of the CC #2 is shifted to a DL subframe #3 corresponding to a subframe set 1 at a DL subframe #4. Therefore, the UE can transmit CSI of the CC #2 through a UL subframe #8 of the CC #3.

Therefore, the second embodiment of the present invention can solve the problem in which CSI reporting of secondary CCs is dropped because of difference between an ABS pattern per CC and a restricted CSI measurement set per CC.

The second embodiment of the present invention can also be applied not only to an environment in which CCs allocated to the relay node (RN) are operated in the FDD or TDD system, but also to another environment in which some CCs are operated in the FDD system and the remaining CCs are operated in the TDD system.

In addition, although the above-mentioned embodiments have exemplarily disclosed the aperiodic CSI reporting examples for convenience of description, it should be noted that the above-mentioned embodiments can also be applied to the periodic CSI reporting.

Figure 16:
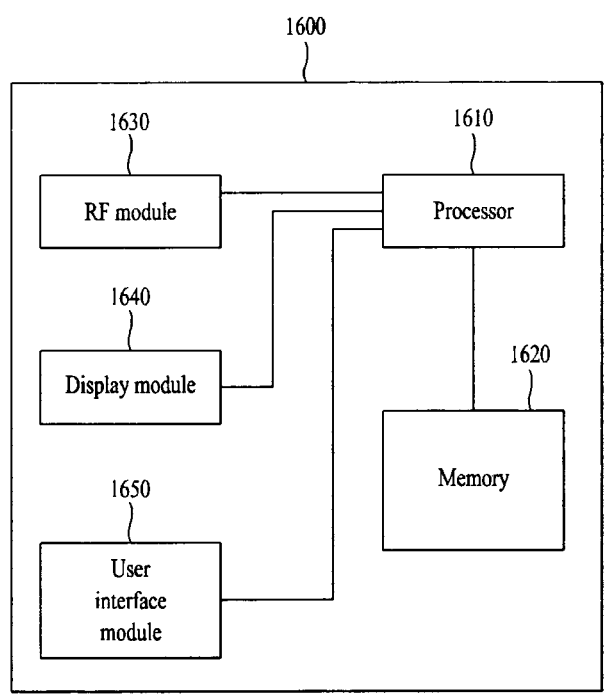
FIG. 16 is a block diagram illustrating a communication device according to one embodiment of the present invention.

FIG. 16 is a block diagram illustrating a communication device according to one embodiment of the present invention.

Referring to FIG. 16, the communication device 1600 includes a processor 1610, a memory 1620, a Radio Frequency (RF) module 1630, a display module 1640, and a user interface module 1650.

The communication device 1600 is disclosed only for illustrative purposes, and some modules may be omitted as necessary. In addition, the communication device 1600 may further include necessary modules. Some modules of the communication device 1600 may be identified as more detailed modules. The processor 1610 is configured to carry out the operations of the embodiments of the present invention. For a detailed operation of the processor 1610, reference will be made to FIGS. 1 to 15.

The memory 1620 is connected to the processor 1610, and stores an operating system, an application, a program code, data and the like. The RF module 1630 is connected to the processor 1610, converts a baseband signal into a radio frequency (RF) signal, or converts the RF signal into the baseband signal. For these operations, the RF module 1630 performs analog conversion, amplification, filtering, and frequency up-conversion in order or performs such operations in reverse order. The display module 1640 is connected to the processor 1610 and displays various information. The scope or spirit of the display module 1640 of the present invention is not limited thereto, and the display module 1640 may be any of well-known elements, for example, a Liquid Crystal Display (LCD), a Light Emitting Diode (LED), an Organic Light Emitting Diode (OLED) and the like. The user interface module 1650 is connected to the processor 1610, and may be implemented as a combination of user interfaces such as a keypad, a touchscreen, etc.

The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicitly cited relation in the appended claims or may include new claims by amendment after application.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of the claims, and all modifications within equivalent ranges of the present invention are within the scope of the present invention.

MODE FOR INVENTION

Various embodiments have been described in the best mode for carrying out the invention.

INDUSTRIAL APPLICABILITY

As apparent from the above description, although the above-mentioned method and apparatus for transmitting a CSI to a macro eNB (MeNB) by a relay node (RN) in a wireless communication system to which carrier aggregation is applied have been disclosed on the basis of application to the 3GPP LTE system, the inventive concept of the present invention is applicable not only to the 3GPP LTE system, but also to other mobile communication systems.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for transmitting channel state information (CSI) from a receiver to a transmitter in a wireless communication system to which carrier aggregation is applied, the method comprising:
    receiving a CSI reporting request corresponding to a specific secondary component carrier (CC) from the transmitter through a primary CC;
    establishing a reference resource for the CSI in association with one or more secondary CCs indicated by the CSI reporting request; and
    transmitting CSIs of the one or more secondary CCs to the transmitter through the specific secondary CC, using the established reference resource,
    wherein the reference resource is set to the nearest subframe serving as a valid downlink subframe of a previous time from a reception time point of the CSI reporting request.

2. The method according to claim 1, wherein the reference resource is the nearest valid downlink subframe #m of the previous time including the downlink subframe #n, from a downlink subframe #n where the CSI reporting request is received.

3. The method according to claim 1, wherein the reference resource is the nearest valid downlink subframe #m of the previous time excluding the downlink subframe #n, from a downlink subframe #n where the CSI reporting request is received.

4. The method according to claim 1, wherein, if the CSI reporting request is received at a downlink subframe #(k−4) and the CSI is transmitted at an uplink subframe #k, the reference resource the nearest valid downlink subframe #p located before the downlink subframe #(k−4), from the downlink subframe #(k−4).

5. The method according to claim 1, wherein the one or more secondary CCs are established by higher layer signaling through the primary CC.

6. A relay node (RN) for use in a wireless communication system to which carrier aggregation is applied, the relay node (RN) comprising:
    a reception module for receiving a channel state information (CSI) reporting request corresponding to a specific secondary component carrier (CC) from a macro eNB (MeNB) through a primary CC;
    a processor for establishing a reference resource for the CSI in association with one or more secondary CCs indicated by the CSI reporting request; and
    a transmission module for transmitting CSIs of the one or more secondary CCs to the macro eNB (MeNB) through the specific secondary CC, using the established reference resource,
    wherein the reference resource is set to the nearest valid subframe established as a backhaul downlink subframe of a previous time from a reception time point of the CSI reporting request.

7. The relay node (RN) according to claim 6, wherein the reference resource is the nearest valid backhaul downlink subframe #m of the previous time including the downlink subframe #n, from a downlink subframe #n where the CSI reporting request is received.

8. The relay node (RN) according to claim 6, wherein the reference resource is the nearest valid backhaul downlink subframe #m of the previous time excluding the downlink subframe #n, from a downlink subframe #n where the CSI reporting request is received.

9. The relay node (RN) according to claim 6, wherein, if the CSI reporting request is received at a downlink subframe #(k−4) and the CSI is transmitted at an uplink subframe #k, the reference resource the nearest valid downlink subframe #p located before the downlink subframe #(k−4), from the downlink subframe #(k−4).

10. The relay node (RN) according to claim 6, wherein the one or more secondary CCs are established by higher layer signaling through the primary CC.

* * * * *